Figure 1:
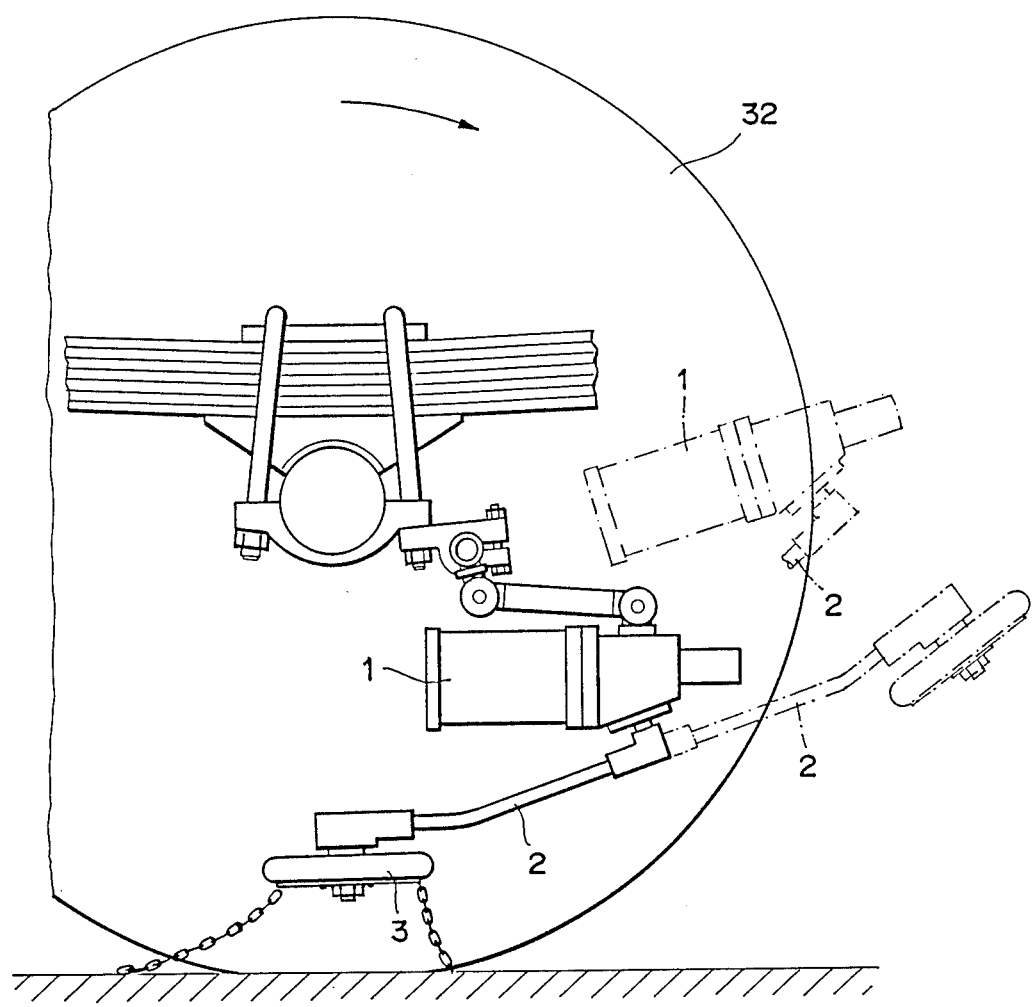

United States Patent [19]

Guyot

[11] Patent Number: 4,809,797
[45] Date of Patent: Mar. 7, 1989

[54] AUXILIARY SNOW-CHAIN DEVICE FOR MOTOR VEHICLES

[75] Inventor: Claude Guyot, St-Aubin, Switzerland

[73] Assignee: Beka St-Aubin SA, St-Aubin, Switzerland

[21] Appl. No.: 143,557

[22] Filed: Jan. 13, 1988

[30] Foreign Application Priority Data

Jan. 21, 1987 [CH] Switzerland .................. 202/87

[51] Int. Cl.⁴ .................................... B60C 27/14
[52] U.S. Cl. ............................ 180/16; 188/4 B
[58] Field of Search ........................ 180/16; 188/4 B

[56] References Cited

U.S. PATENT DOCUMENTS

| | | | |
|---|---|---|---|
| 2,283,948 | 5/1942 | Ridgway | 188/4 B |
| 2,790,514 | 4/1957 | Robinson | 188/4 B |
| 3,658,158 | 4/1972 | Saupp | 188/4 B |
| 4,602,521 | 7/1986 | Bishop et al. | 74/498 |

FOREIGN PATENT DOCUMENTS 3440951 5/1986 Fed. Rep. of Germany ........ 180/16

Primary Examiner—Kenneth R. Rice
Attorney, Agent, or Firm—Townsend & Townsend

[57] ABSTRACT

The device is made up of a double-action jack (4, 5, 6, 7, 12, 13), a case (9), a tip (10) and a fixing means (11). A rack (15), integral with the piston (12) of the jack, rotatingly drives a pinion (17) guided by two bearings (23, 24). On the fluted end (36) of the shaft (22) of the pinion there is fixed a swivel arm (2) having an axis perpendicular to the axis of articulation (18). This axis forms with the axis (16) of the rack an angle α other than 90 degrees. Owing to this angle α, the swivel arm and a small wheel (3) attached thereto, when swivelling from a retracted position to an engaged position, move in a plane which is oblique relative to the horizontal, even though the cage (1) of the device may be placed in such a way that its axis is horizontal.

9 Claims, 5 Drawing Sheets

U.S. Patent    Mar. 7, 1989    Sheet 1 of 5    4,809,797

AUXILIARY SNOW-CHAIN DEVICE FOR MOTOR VEHICLES

This invention relates to winter equipment for motor vehicles, and more particularly to an auxiliary snow-chain device of the type having a cage, a rack actuated by a means which can be controlled from the cabin of the vehicle, the rack being capable of axial displacement within the cage, and a pinion engaging the rack and supported in the cage on both sides thereof, a swivel arm fixed to the shaft of the pinion and provided at its end with a small wheel bearing several lengths of chain, the arm being able to occupy two positions, one free, the other engaged when the small wheel is pressed under the influence of the said means into a certain position against the inner sidewall of the vehicle wheel, the lengths of chain then being successively thrown between the ground and the wheel owing to the rotation of the small wheel, and a means for joining the cage rigidly to a fixed element under the vehicle, such as a suspension element or a leaf-spring suspension bracket.

The driver of a vehicle equipped with such a device has an antispinning means for the driving wheels which he can actuate quickly and automatically, particularly when the roads are icy or covered with snow.

Among the major difficulties encountered with this type of device are the problems of space and the positioning of the small wheel. The space problem, which presents itself in a different way for each type of vehicle, is dual: it is a question of determining as judicious a placement of the cage of the device as possible under the vehicle and providing the necessary clearance for the swivel arm when it is brought from the free position into the engaged position or vice versa. The problem of positioning the small wheel derives from the fact that the plane of this small wheel, when it is engaged, must form a certain angle with the plane of the vehicle wheel or, correlatively, with the horizontal.

In prior art devices, the swivel arm, provided with the small wheel, is articulated about a shaft fixed to the vehicle by means of a rod-crank arrangement actuated by a single-acting pneumatic piston. Other designs comprise a piston-rack-and-pinion assembly, the axis of rotation of the swivel arm being identical with that of the pinion, but orthogonal to that of the rack.

In U.S. Pat. No. 2,283,948, the rack axis and the pinion axis form a 90° angle. Thus the device comprises the addition of complex mechanisms for guidance and for articulation of the swivel arm.

These prior art devices are difficult to install and do not satisfactorily solve the problems discussed above. Moreover, they require complex and delicate contrivances for mounting, which increases their final cost-price.

It is an object of this invention to provide an improved auxiliary snow-chain device which appreciably facilitates the positioning of the small wheel, having to satisfy certain conditions, and which permits multiplying the siting possibilities of the cage of the device, no matter what the type of vehicle.

A further object of the invention is to provide such a device in which the cage can be arranged horizontally.

Still another object of the invention is to provide an auxiliary snow-chain device which can be installed not only on trucks alone, as is the case with prior art devices, but also on types of vehicles having less clearance from the ground, especially on passenger cars.

To this end, in the auxiliary snow-chain device according to the present invention, of the type initially mentioned, the swivel arm is controlled solely by the pinion, i.e., by a shaft extending the pinion, which pinion meshes with the rack, and in that the longitudinal axis of the rack and the axis of the pinion and its shaft form between them a predetermined angle α other than 90°, the pinion having a spur toothing or helical toothing and the rack a corresponding toothing, the cage being arrangeable, as a function of the available location, in such a way that its axis corresponding to the axis of the rack is oriented equally well either horizontally or obliquely.

Figure 2:
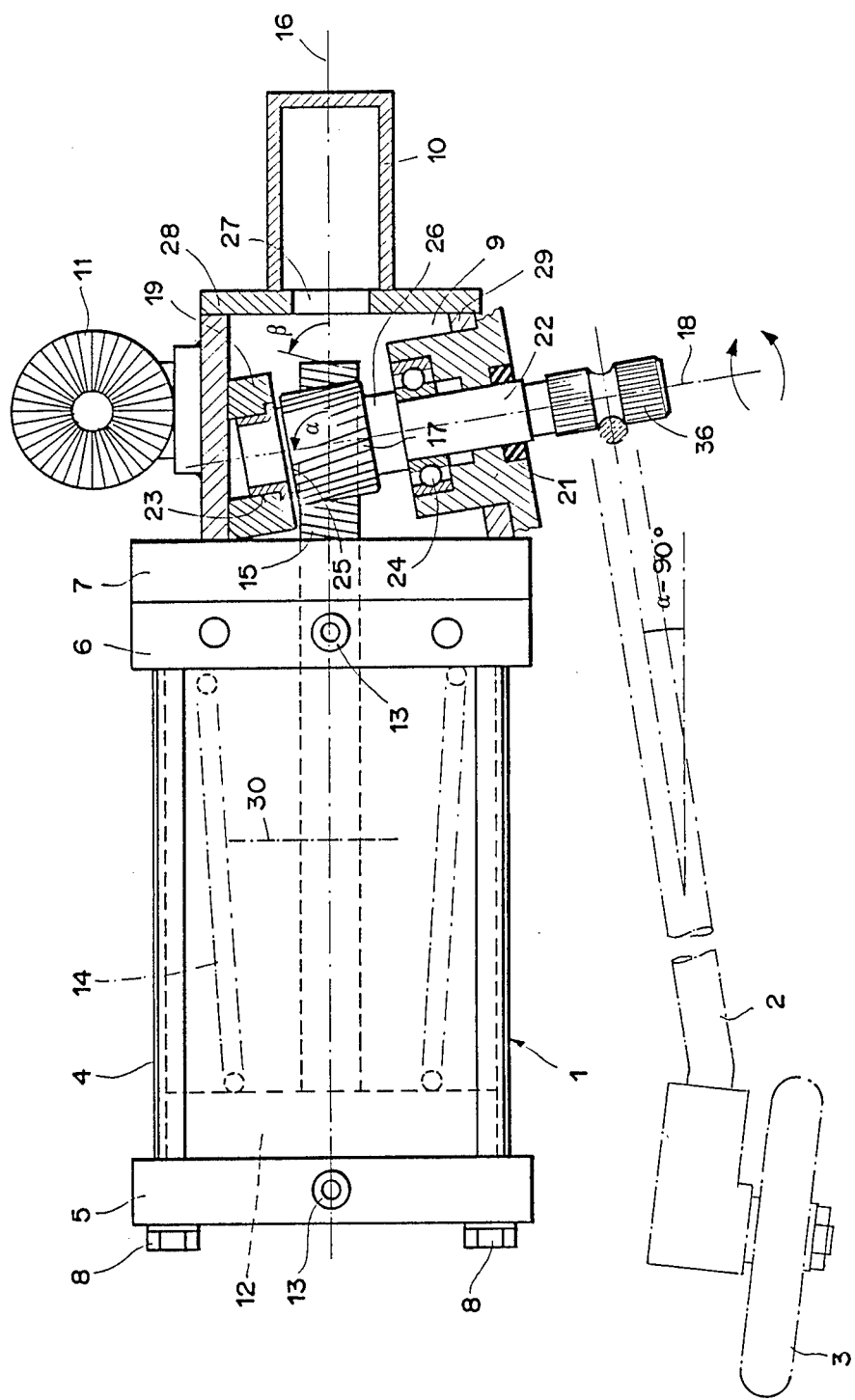
Figure 3:
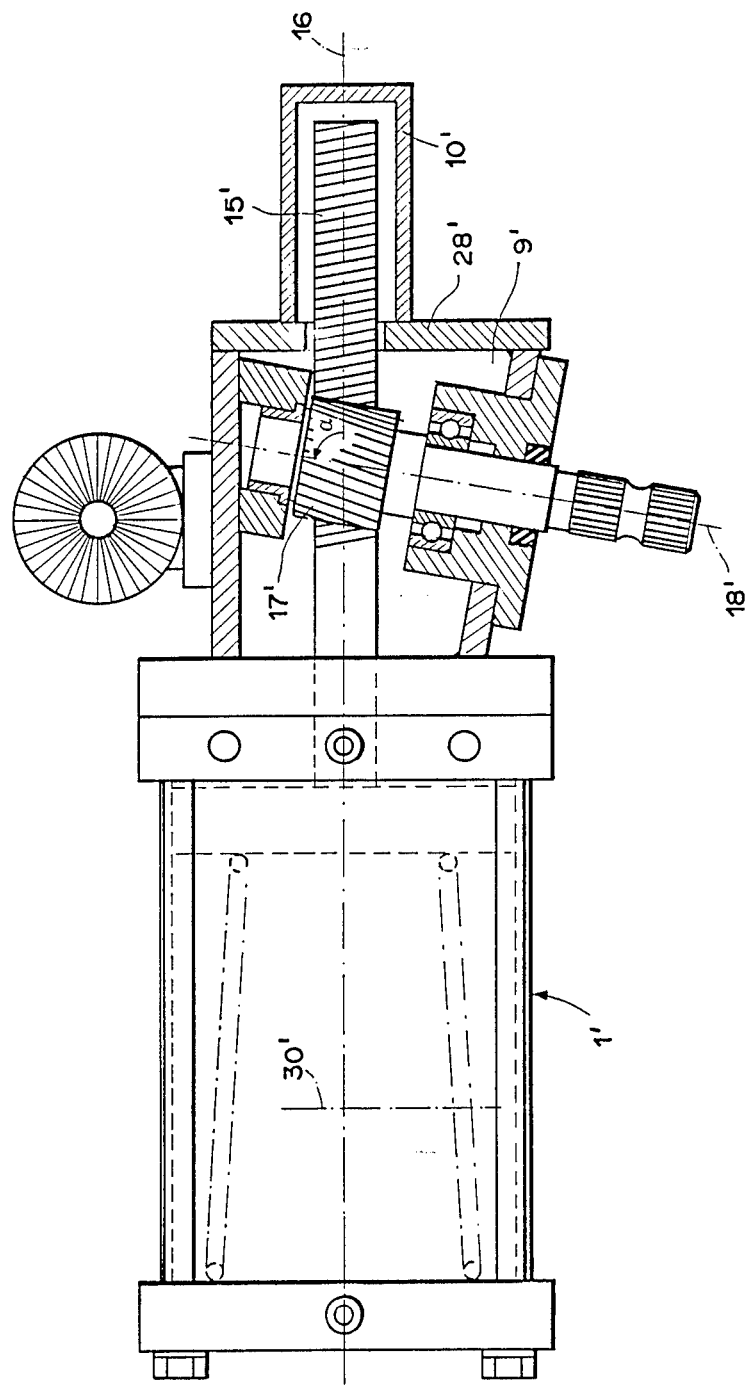
Figure 4:
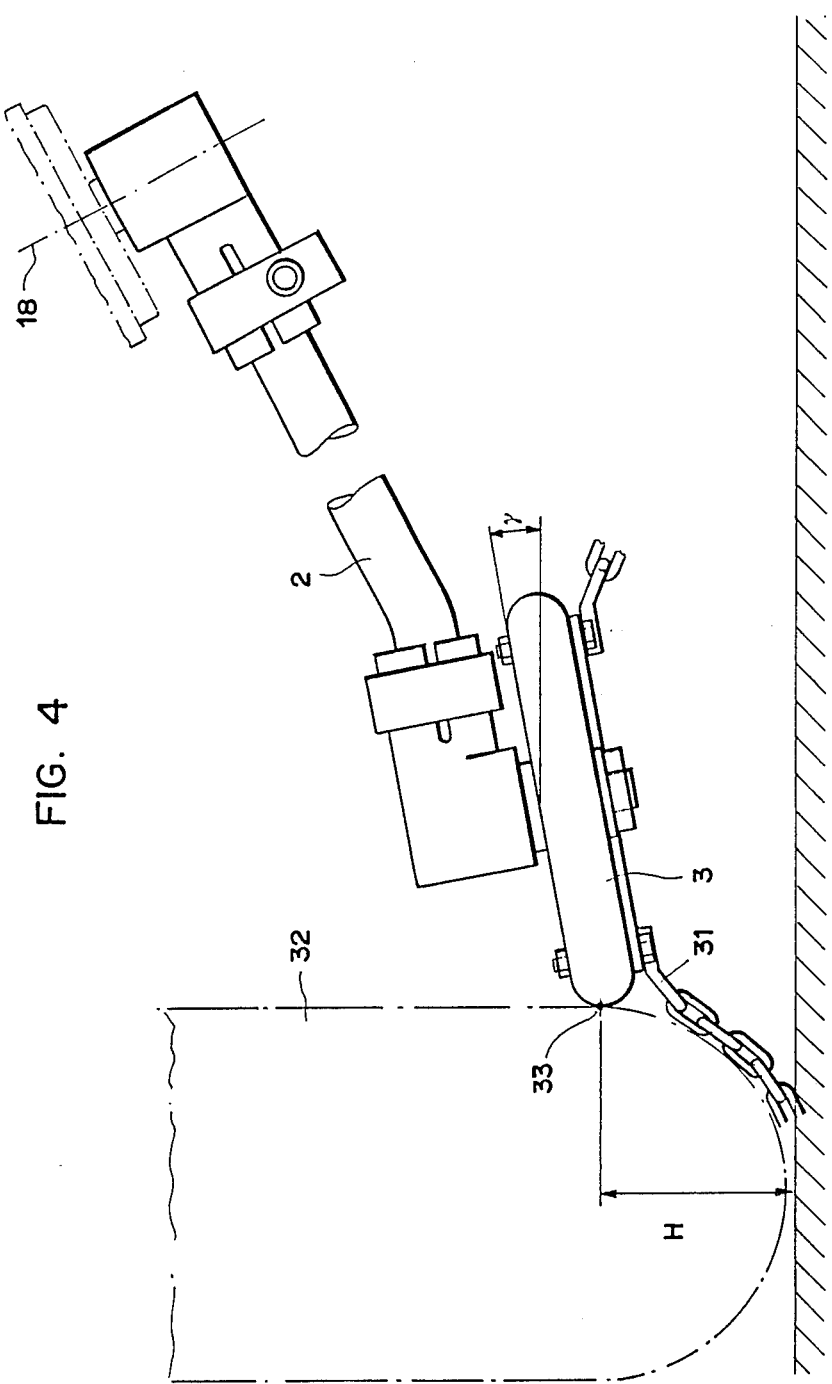
Figure 5:
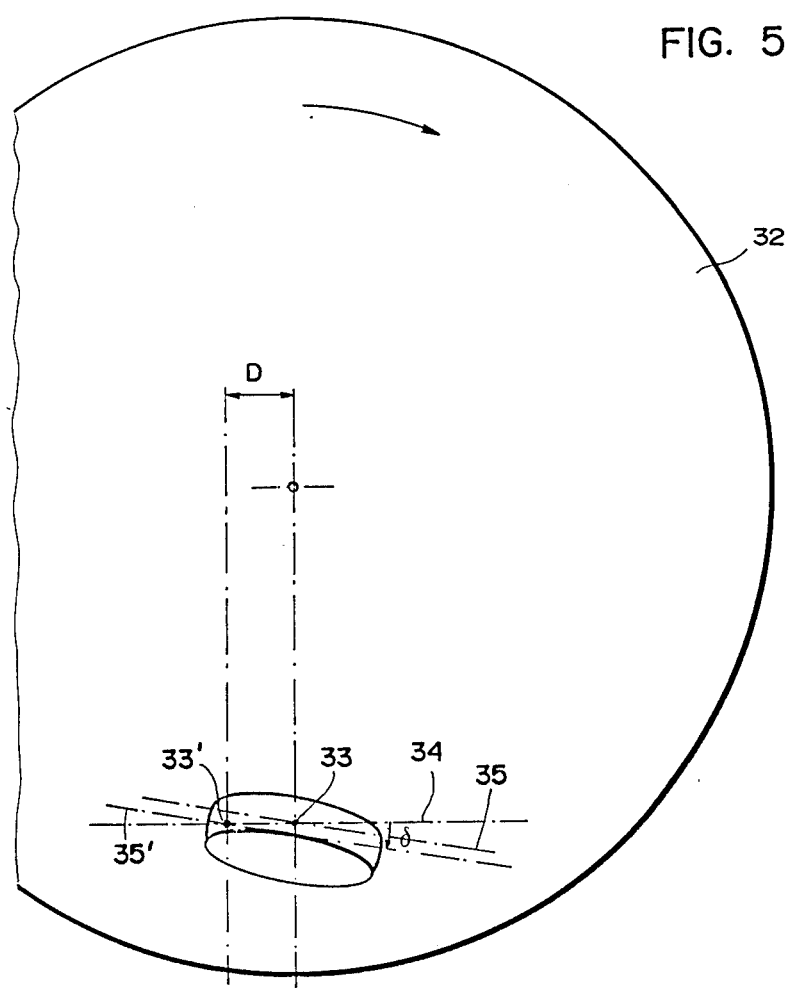

Preferred embodiments of the invention will now be described in detail with reference to the accompanying drawings, in which:

FIG. 1 is an overall diagrammatic view of one alternative for installing the device, FIG. 2 is a longitudinal section of the cage accommodating the means for actuating and driving the swivel arm, FIG. 3 is a longitudinal section depicting an alternative arrangement of the means for actuating and driving the swivel arm, FIG. 4 is a side elevation of the small wheel in engaged position, and FIG. 5 is a diagrammatic front elevation of the small wheel in engaged position.

In FIG. 1, the device according to one alternative of installation is depicted diagrammatically. It is seen that a cage 1 is placed under the vehicle, preferably horizontally, in the chosen zone near a driving wheel 32 which it is desired to keep from spinning, and that the cage is rigidly joined to the vehicle by means not described. The cage 1 accommodates actuating and driving means so that a swivel arm 2, provided with a small wheel 3, may be brought from its free position (arm pointing upward) toward its engaged position (arm pointing downward) and vice versa. Analogously, the device will be mounted in a zone, suitable in each case, near the other driving wheel or wheels.

FIGS. 2 and 3 are longitudinal sections of two types of design of the cage of the device conforming to the same operating principle, only the arrangement of the actuating means being different. In FIG. 3, the elements identical to those of FIG. 2 are designated in the description by the same reference numerals, which do not, however, appear again in FIG. 3. The analogous elements likewise bear the same reference numerals but with the addition of a prime (').

The cage 1 or 1' is made up of a jack comprising a cylinder 4, flanges 5, 6, 7, and assembly means 8 and orifices 13 for connection to the pressure. As an extension of the cage 1, there is mounted on the flange 7 a case 9 or 9' which is in turn extended by a tip 10 or 10'. This tip is fixed, e.g., by welding, to a front plate 28 (or 28') of the case 9 (or 9'). A means 11 for fixing the cage to the vehicle is provided on the top plate of the case 9 (or 9'). This case is preferably square or rectangular in cross-section (FIGS. 2 and 3).

The case 9 comprises two bearing supports 19 and 20 having the same axis 18 and receiving bearings 23 and 24, respectively. In the embodiment being described, the bearing 23 is a bronze bearing, while the bearing 24 is a ball bearing. These bearings are used to guide rotatingly a shaft 22 of a pinion 17, which is prevented from moving axially by shoulders 25 and 26. The shaft 22 and the pinion 17 are preferably made in one piece. The pinion 17 meshes with a rack 15, integral with a piston 12. An aperture 27 made in the front plate 28 of the case 9 allows the rack 15 to pass into the tip 10. A gasket 21 ensures the fluidtightness of the case 9. It will be noted that the common axis 18 of the pinion 17 and the shaft 22 forms an angle α with the longitudinal axis 16 of the rack 15. The value of this angle will preferably be selected from the range of from 100 to 140 degrees. In a preferred embodiment, the value selected is 125 degrees. Thus, the angle which will be formed between the axis of the arm 2 perpendicular to the axis 18 and the horizontal will be (α−90°), hence (125°−90°)=35 degrees (FIG. 2). Owing to this inclination, the toothing of the pinion is either a spur toothing or a helical toothing, that of the rack is oblique, the inclination β, relative to the axis 16, being situated in a corresponding range of from 80 to 40 degrees. A bottom plate 29, on which the bearing support 20 is mounted, perpendicular to the axis 18, is inclined toward the front and forms with the axis 16 an angle equal to (α−90) degrees. Analogously, the design of the bearing support 19 takes this particularity into account (FIG. 2). In the modification shown in FIG. 3, the axes 16 and 18' form an angle α', the value of which is preferably in the range of from 40 to 80 degrees. The structural particularities of the case 9', the particularities of the size of the pinion 17' and of the rack 15' are mirror-images of those which have just been described on the basis of FIG. 2.

In a preferred embodiment, e.g., for a truck, the overall size of the cage (without attachment means 11) is about 350×120×120 mm. The cylinder 4, 100 mm in diameter, is actuated by a pressure P of 6 bars, the pressing force of the small wheel, 200 mm in diameter, then being approximately 30 kg. The diametral pitch of the pinion 17, 35 mm in diameter, is chosen so as to obtain the required arc of spread of the swivel arm going from the free position to the engaged position or vice versa.

These values will, of course, be appreciably reduced, by at least one-third, for devices intended to be installed on a passenger car.

FIG. 4 is a profile view of the swivel arm, which rotates about the axis 18, and at the end of which the small wheel 3, provided with lengths of chain 31, is fixed. The small wheel is seen to be slightly inclined relative to the sidewall of the wheel 32 or, correlatively, relative to the horizontal. The angle α formed between the horizontal and the plane of the small wheel is situated in a range of from 0 to 10 degrees, the entry of the chain 31 between the tire of the wheel 32 and the ground thus being facilitated. The bearing point 33 of the small wheel against the tire tread of the vehicle wheel is situated at a height H from the ground, which is a function of the type of wheel, the point 33 being situated in the zone of reinforcement of the tire.

FIG. 5 is a diagrammatic front elevation of the small wheel 3 pressing against the wheel 32. It will be noted that the point 33 may be situated on the axis of the wheel or slightly offset at a distance D behind the direction of travel at a point 33'. This distance D is preferably selected in a range of from 0 to 15 mm. The radial plane of the small wheel thus viewed frontally intersects the plane of the sidewall of the wheel along a horizontal line 34 or a line 35 (or 35') slightly inclined toward the front, in the direction of travel, the lines 34 and 35 (or 35') forming between them an angle δ of 0 to 3 degrees.

The operation of the device is as follows: the jack 4, 5, 6, 12, 13 is double-acting and is connected at 13 to the pneumatic circuit of the vehicle, as well as to a control which may be situated in the cabin of the vehicle. As the case may be, a pressure reducer will have to be provided in order that the piston 12 may be subjected to the required pressure P. FIG. 2 depicts the cage of the device when the swivel arm is in free position. Under the action of the pressure P, the piston 12 will be displaced axially toward the right in the cylinder 4 up to the reference numeral 30, carrying along the rack 15, guided by a support (not shown) situated under the rack and permitting, at the same time, to eliminate the pinion-rack backlash and to absorb the residual vibrations. At the time of the displacements of the rack 15 toward the tip 10, the pinion 17 is in turn driven rotatingly, thus imparting to the swivel arm 2, fixed on the fluted end 36 of the shaft 22 (FIG. 2) a rotary movement about the axis 18 so as to describe an arc of a circle going up to about 220 degrees. According to the location of the cage 1 and the alternative chosen, the arm will swivel under or toward the front of the cage. The small wheel 3 is thus brought to the desired point 33 (or 33') of contact with the vehicle wheel 32. The pressure P is maintained on the piston 12; the small wheel 3 is driven rotatingly when the vehicle moves, and the lengths of chain 31 are successively thrown between the tire of the vehicle and the ground, which has the effect of thus eliminating any risk of spinning. Conversely, when the opposite face of the piston 12 is subjected to the pressure P, the rack 15 moves toward the left (FIG. 2), the small wheel will move away from the vehicle wheel 32, and the lengths of chain 33 will cease to be subjected to centrifugal force. The swivel arm 2 will thus assume its free position upward (FIG. 1). For safety reasons, it is preferable to provide a return component 14 which will ensure that the swivel arm is returned to the disengaged position in case of a break in pressure in the pneumatic circuit. The device mounted near the corresponding driving wheel will operate analogously. The two devices will be connected to a distribution means so that the movements of the swivel arm, from the free position to the engaged position and vice versa, take place either in step or alternately.

Owing to the angle α other than 90 degrees, the arm 2 and the small wheel 3, when swivelling from the free position to the engaged position, move in a plane which is oblique relative to the horizontal, even if the cage 1 has been placed optimally, its axis being oriented horizontally (or obliquely), taking into account the available space.

What is claimed is:

1. An auxiliary snow-chain device for a motor vehicle, particularly a truck, comprising a cage, means for fixing said cage rigidly to a fixed element under the vehicle, a rack coaxial with said cage and axially displaceable within said cage, rack-actuating means controllable from the cabin of the vehicle, a pinion meshing with said rack, a shaft bearing said pinion and supported in said cage on both sides of said pinion, a swivel arm fixed to said shaft, a small wheel fixed to the end of said swivel arm remote from said shaft, and a plurality of lengths of chain attached to said small wheel, said arm being movable between a retracted position and an engaged position wherein said small wheel is pressed via said rack-actuating means into a predetermined position against the inside of a rotating wheel of the motor vehicle, whereby said lengths of chain are successively thrown between the vehicle wheel and the ground owing to rotation of said small wheel against the vehicle wheel, said swivel arm being moved solely by said pinion via said shaft, the longitudinal axis of said rack and the axis of said pinion and said shaft forming between them a predetermined angle $\alpha$ of other than 90 degrees, said pinion having a spur toothing or helical toothing and said rack having a matching toothing, and the longitudinal axis of said cage being disposable either horizontally or obliquely depending upon the available location.

2. The device of claim 1, wherein said angle $\alpha$ is between 100 and 140 degrees.

3. The device of claim 1, wherein said angle $\alpha$ is between 40 and 80 degrees.

4. The device of claim 1, wherein said means for actuating said rack is a double-action jack.

5. The device of claim 4, further comprising pneumatic pressure means for actuating said double-action jack.

6. The device of claim 4, further comprising hydraulic pressure means for actuating said double-action jack.

7. The device of claim 4, further comprising vacuum means for actuating said double-action jack.

8. The device of claim 4, further comprising a return part disposed in said cage, acting contrary to the pressure of said piston pressing said small wheel against the inside of the vehicle wheel.

9. The device of claim 1, further comprising a return part disposed in said cage, acting contrary to the pressure of said piston pressing said small wheel against the inside of the vehicle wheel.

* * * * *